(12) United States Patent
Clanzett et al.

(10) Patent No.: US 12,339,983 B2
(45) Date of Patent: Jun. 24, 2025

(54) PROVIDING AND OBTAINING ONE OR MORE DATA SETS VIA A DIGITAL COMMUNICATION NETWORK

(71) Applicant: Noscendo GmbH, Duisburg (DE)

(72) Inventors: Sebastian Clanzett, Alpen (DE); Rene Hennig, Wuppertal (DE); Philip Stevens, Alpen (DE)

(73) Assignee: Noscendo GmbH, Duisburg (DE)

( * ) Notice: Subject to any disclaimer, the term of this patent is extended or adjusted under 35 U.S.C. 154(b) by 286 days.

(21) Appl. No.: 17/806,448

(22) Filed: Jun. 10, 2022

(65) Prior Publication Data
US 2022/0300634 A1    Sep. 22, 2022

Related U.S. Application Data

(63) Continuation of application No. PCT/EP2020/084951, filed on Dec. 7, 2020.

(30) Foreign Application Priority Data

Dec. 12, 2019   (EP) ..................................... 19215850

(51) Int. Cl.
*G06F 21/62*   (2013.01)
*H04L 9/40*    (2022.01)

(52) U.S. Cl.
CPC .......... *G06F 21/6218* (2013.01); *H04L 63/08* (2013.01)

(58) Field of Classification Search
CPC . G06F 21/6218; H04L 63/08; H04L 63/0853; H04L 63/0861; H04L 63/101;
(Continued)

(56) References Cited

U.S. PATENT DOCUMENTS 7,231,450 B1 *  6/2007  Clifford ................. H04L 63/08
                                                       709/225
9,768,962 B2 *  9/2017  Acar ..................... H04L 9/3226
(Continued)

FOREIGN PATENT DOCUMENTS

CN    101069402 A    11/2007
CN    106063308 A    10/2016
(Continued)

OTHER PUBLICATIONS

Berners-Lee, T., "Universal Resource Identifiers in WWW: A Unifying Syntax for the Expression of Names and Addresses of Objects on the Network as used in the World-Wide Web," Network Working Group, Jun. 1994, <https://www.rfc-editor.org/rfc/rfc1630> (28 pages).

(Continued)

*Primary Examiner* — Khalid M Almaghayreh
(74) *Attorney, Agent, or Firm* — PERKINS COIE LLP; Michael A. Glenn

(57) ABSTRACT

A server for providing one or more data sets via a digital communication network is configured for: associating an unique identifier with an identified data set, the unique identifier representing a network address for accessing the identified data set via the digital communication network, wherein the unique identifier is specific to the identified data set; validating an authentication information provided by an authenticator of a client requesting access to the server via the unique identifier; and selectively providing the client with an access right for one or more data sets, if the authentication information identifies the authenticator as being associated with a registered user.

17 Claims, 7 Drawing Sheets

(58) Field of Classification Search
CPC ............. H04L 63/0884; H04L 63/0876; H04L 63/0421; H04L 63/062; H04L 63/0823
See application file for complete search history.

(56) References Cited

U.S. PATENT DOCUMENTS

| | | | | |
|---|---|---|---|---|
| 11,887,119 | B1* | 1/2024 | Campbell | G06Q 20/3821 |
| 2008/0127320 | A1* | 5/2008 | De Lutiis | H04L 61/5084 |
| | | | | 726/9 |
| 2008/0263631 | A1 | 10/2008 | Wang et al. | |
| 2012/0054824 | A1 | 3/2012 | Furukawa | |
| 2016/0092643 | A1* | 3/2016 | Hinkle | G06Q 10/10 |
| | | | | 705/2 |
| 2016/0267229 | A1* | 9/2016 | High | G16H 20/13 |
| 2016/0380999 | A1* | 12/2016 | Tevlin | H04W 12/06 |
| | | | | 713/151 |
| 2017/0026321 | A1* | 1/2017 | Ciavatta | H04L 51/04 |
| 2017/0317879 | A1* | 11/2017 | Wei | H04L 41/0813 |
| 2018/0131684 | A1* | 5/2018 | Standefer, III | G06F 21/6218 |
| 2019/0156020 | A1* | 5/2019 | Sato | H04L 9/0894 |
| 2020/0014538 | A1* | 1/2020 | Liu | H04L 9/3231 |
| 2021/0258308 | A1* | 8/2021 | Avetisov | H04L 9/0825 |
| 2022/0109674 | A1* | 4/2022 | Avetisov | H04L 63/0884 |
| 2023/0104852 | A1* | 4/2023 | Dickie | H04L 63/061 |
| | | | | 726/26 |

FOREIGN PATENT DOCUMENTS

| | | |
|---|---|---|
| CN | 109618326 A | 4/2019 |
| CN | 109768977 A | 5/2019 |
| JP | 2004295588 A | 10/2004 |
| JP | 2019096077 A | 6/2019 |
| KR | 20120072014 A | 7/2012 |
| KR | 20160085143 A | 7/2016 |
| RU | 2440688 C2 | 1/2012 |

OTHER PUBLICATIONS

Berners-Lee, T., et al., "Uniform Resource Identifier (URI): Generic Syntax," Network Working Group, Jan. 2005, <https://www.rfc-editor.org/rfc/rfc3986> (61 pages).

Bradley, J., et al. "Web Authentication: An API for accessing Public Key Credentials Level 3," Editor's Draft, Jul. 27, 2002, <https://w3c.github.io/webauthn/> (179 pages).

Sun Yuanwei; "Analysis of computer network security measures", Network security technology and application, vol. 04, Apr. 15, 2015—2 pages. (No English translation available).

* cited by examiner

PROVIDING AND OBTAINING ONE OR MORE DATA SETS VIA A DIGITAL COMMUNICATION NETWORK

CROSS-REFERENCES TO RELATED APPLICATIONS

This application is a continuation of copending International Application No. PCT/EP2020/084951, filed Dec. 7, 2020, which is incorporated herein by reference in its entirety, and additionally claims priority from European Application No. EP 19 215 850.9, filed Dec. 12, 2019, which is incorporated herein by reference in its entirety.

Embodiments according to the invention relate to the field of transferring data via a digital communication network. More specifically, embodiments of the invention relate to servers and methods for providing one or more data sets via a digital communication network. Further embodiments of the invention relate to devices and methods for obtaining a data set via a digital communication network. Further embodiments relate to a method and a system for securely retrieving information about analyzed data via a digital communication network like the internet, an intranet or the like.

Further embodiments of the invention relate to a computer method and system for securely granting access to analyzed data via the internet.

BACKGROUND OF THE INVENTION

Providing or transferring information, for example information of analyzed data, can happen in distinct ways, for example the traditional way via print-out reports. This way, it is easy to guarantee that a) the recipient receives the message in appropriate time, with appropriate security features and with the appropriate convenience. Most often, a classical mail delivery system utilizing registered mail is used to fulfill such requirements. As an example, the registered letter of notary or analysis reports/diagnostic results are sent to the customer/patient.

However, the other way information is today transferred around the world is by utilizing the world wide web/the internet. Here, a lot of convenience comes into play. By using the internet, or in general a digital communication network, one can give and/or create access to information fast, easy and independent of the requester location to almost everyone immediately. By using a worldwide network of servers the internet allows to send all kind of information to a client. Today, the internet is used in unlimited ways, like social networking, processing financial transactions or controlling industrial appliances. With rising penetration in all areas, security is getting a great concern. Most people already have access to the internet and are available via several ways. One of them is e-mail. The e-mail as an "everywhere" available feature of information exchange is, without a doubt, the most often used way to exchange all sorts of information, from documents, to videos, pictures and so on.

Today, the wide availability of the smartphone makes it possible to almost always and everywhere check for new information regarding oneself or processes surrounding oneself. However, especially in the healthcare sector, this information is most often of such valuable and private nature that an e-mail, and most other information sharing products like instant messenger, picture/photo or video sharing platforms or even document exchange software is not appropriate for such kind of information.

Huge efforts have been made in the last couple of years to create secure and still highly convenient places to store information, even critical and private information, in the cloud. Securing data at rest, i.e. while not in transit, is mostly a question of what encryption algorithm is used. This also holds true for data which is persisted on some kind of computer hardware. However, most often, even today, the process of authentication of some user credentials is not very secure. Again, hashing passwords in a database (as this database is persisted on some computer hardware) is a rather secure way to hold this information. In the process of logging-in (checking credentials) and retrieving data, especially healthcare data, additional, subsequent checks of permissions are needed to assure the user that only people with appropriate permissions get access to the analyzed data.

In IT-Systems design there is a constant assessment of security vs. convenience. Many, if not all, people want their private data (especially healthcare data) to be secure and safe, wherever it is stored. However, to use such data it is granted that to access the data one needs to have the most convenient and yet most secure way of accessing it.

Accessing sensitive information, like personal data, via internet requires a secure transport channel as well as a secure authentication mechanism. The actual gold standard is authentication via username and password, which relies heavily on the strength of the used password. While weak passwords are easy to guess, strong passwords are hard to remember. In addition to that the username often consists of a part of or even the whole name of the person who wants to authenticate himself. In most scenarios the authenticator is the person the data belongs to. However, especially in the healthcare setting—which is becoming more and more digitized—the requester of personal data of an individual is a service provider. This might, in the healthcare setting, be a physician, clinician or laboratory service provider.

While, as described, transit of data is most often securely done, the information regarding the individual requesting certain (health) data is not protected because login credentials (i.e. username and password) are submitted and transferred. Thus, the identity of such an individual is traceable because besides login credentials also the actual geo-location (via ip address) is traceable. This leads to a vulnerability also for the individual the data is about. Another problem in accessing information via the internet is the identification of that information. For example requesting detailed information about a certain product may result in different information about a different product.

It is an object of embodiments of the invention to provide a concept for transferring information, the concept providing an improved tradeoff between user convenience and data security of both, the transferred information and information about the user.

SUMMARY

An embodiment may have a server for providing one or more data sets via a digital communication network, wherein the server is configured for: associating an unique identifier with an identified data set, the unique identifier representing a network address for accessing the identified data set via the digital communication network, wherein the unique identifier is specific to the identified data set, validating an authentication information provided by an authenticator of a client requesting access to the server via the unique identifier, and selectively providing the client with an access right for one or more data sets, if the authentication information identifies the authenticator as being associated with a registered user.

Another embodiment may have a server for providing a data set via a digital communication network, wherein the server is configured for: associating an unique identifier with the data set, the unique identifier representing a network address for accessing the data set via the digital communication network, wherein the unique identifier is specific to the data set, validating an authentication information provided by an authenticator of a client requesting access to the data set via the unique identifier, and selectively providing the client with an access right for the data set, the access right being specific to a registered user that is associated with the authenticator.

Another embodiment may have a device for acquiring a data set via a digital communication network, wherein the device is configured for acquiring an unique identifier of the data set, the unique identifier representing a network address for accessing the data set via the digital communication network, wherein the unique identifier is specific to the data set, wherein the device comprises a client configured for using the unique identifier for sending a request for accessing the data set to a server providing the data set, wherein the client is configured for providing the server with an authentication information of an authenticator for authenticating the client against the server, wherein the authenticator is associated with a registered user.

Another embodiment may have a method for providing one or more data sets via a digital communication network, the method comprising: associating an unique identifier with an identified data set, the unique identifier representing a network address for accessing the identified data set via the digital communication network, wherein the unique identifier is specific to the identified data set, validating an authentication information provided by an authenticator of a client requesting access to one or more data sets via the unique identifier, and selectively providing the client with an access right to one or more data sets, if the authentication information identifies the authenticator as being associated with a registered user.

Another embodiment may have a method for acquiring a data set via a digital communication network, the method comprising: acquiring an unique identifier of the data set, the unique identifier representing a network address for accessing the data set via the digital communication network, wherein the unique identifier is specific to the data set, using the unique identifier for sending a request for accessing a server hosting the data set, providing the server with an authentication information of an authenticator for authenticating the client against the server, wherein the authenticator is associated with a registered user.

Another embodiment may have a non-transitory digital storage medium having a computer program stored thereon to perform the method for providing one or more data sets via a digital communication network, the method comprising: associating an unique identifier with an identified data set, the unique identifier representing a network address for accessing the identified data set via the digital communication network, wherein the unique identifier is specific to the identified data set, validating an authentication information provided by an authenticator of a client requesting access to one or more data sets via the unique identifier, and selectively providing the client with an access right to one or more data sets, if the authentication information identifies the authenticator as being associated with a registered user, when said computer program is run by a computer.

Another embodiment may have a non-transitory digital storage medium having a computer program stored thereon to perform the method for acquiring a data set via a digital communication network, the method comprising: acquiring an unique identifier of the data set, the unique identifier representing a network address for accessing the data set via the digital communication network, wherein the unique identifier is specific to the data set, using the unique identifier for sending a request for accessing a server hosting the data set, providing the server with an authentication information of an authenticator for authenticating the client against the server, wherein the authenticator is associated with a registered user, when said computer program is run by a computer.

According to the invention, such a concept is provided by identifying an information, such as a data set, provided by a server with an unique identifier that is specific to the information, and by using an authenticator that is associated with a registered user for verifying an access right of a user requesting access to the information. The combination of these features allows for securely and specifically providing the information, and for keeping an information about an identity of the user requesting access to the information secret.

An embodiment according to the invention provides a server for providing one or more data sets via a digital communication network, such as the internet or an intranet. The server is configured for associating an unique identifier with an identified data set, e.g. a specific data set of the one or more data sets, the specific data set being identified by the unique identifier. The unique identifier represents a network address for accessing the identified data set via the digital communication network, and the unique identifier is specific to the identified data set. The server is further configured for validating an authentication information provided by an authenticator of a client requesting access to the server, for example requesting access to one or more data sets hosted or provided by the server, via the unique identifier. For example, validating the authentication information comprises an evaluation of the authentication information for obtaining or verifying an identity of the authenticator. The server is configured for selectively providing the client with an access right for one or more data sets, if the authentication information identifies the authenticator as being associated with a registered user, for example a previously registered user. For example, validating the authentication information may comprise a verification, if the authenticator is associated with a registered user.

For example, the server is configured for providing the registered user with the unique identifier. Having the unique identifier of the identified data set, allows a user to identify the identified data set and ensures a user to request a desired data set, thus preventing false information. The registered user may use the network address represented by the unique identifier to access the server by using the client. As the client uses the authenticator for authenticating against the server, the registered user is not required to authenticate against the server by using credentials comprising information about an identity of the registered user. Thus, for accessing a data set on the server, a transfer of the identity of the registered user between the client and the server is not necessary, so that the identity of the registered user requesting access to the server is secure. In other words, by using this kind of authentication, there is no need to exchange personal data between the client and the server. Additionally, by using the authenticator for authentication of the registered user, the registered user is not necessarily required to represent an individual natural person, but may also represent an entity of users, for example a group of persons, such that multiple persons or users may use the same authenticator associated with the registered user. Thus, using the authenticator enhances the flexibility and the user convenience, for example in situations where multiple persons share a task that is associated with the provided data set. The access right to one or more data sets may, for example, comprise an access right to the identified data set, but may also comprise an access right to further data sets hosted by the server, so that a user may access a plurality of data sets hosted by the server, if the client used by the user authenticates as a registered user. Thus, granting access to the one or more data sets to the registered user enhances the user convenience of the data provision.

According to an embodiment, the server is configured for validating the authentication information provided by the authenticator of the client requesting access to the identified data set via the unique identifier; and the server is configured for selectively providing the client with the access right for the identified data set, wherein the access right for the identified data set is specific to the registered user associated with the authenticator. The user specific access right allows for providing the identified data set to a specific registered user. Thus, the server may ensure that the identified data set is specifically and selectively provided to a registered user granted the specific access right. Thus, the server may grant multiple users with an individual access right to the identified data set. Thus, the user specific access right enhances the data security of the identified data set, as only one or more specific registered users may access the identified data set.

An embodiment according to the invention provides a server for providing a data set, for example designated as the identified data set, via a digital communication network. The server is configured for associating an unique identifier with the data set, the unique identifier representing a network address for accessing the data set via the digital communication network, wherein the unique identifier is specific to the data set. The server is further configured for validating an authentication information provided by an authenticator of a client requesting access to the data set via the unique identifier. The server is configured for selectively providing the client with an access right for the data set, the access right being specific to a registered user that is associated with the authenticator. The server combines the functionality and the advantages of the foregoing embodiments.

According to an embodiment, the server is configured for registering the authenticator by associating the authenticator with an identity information identifying a user. For example, the registered user may be a user that may have registered previously by providing an identity information for verifying the identity of the user. For example, the registered user may register the authenticator by providing an information specifying the authenticator, for example by providing an authentication information. For example, the server is configured for storing an information identifying the authenticator, which may for example be based on or derived from the authentication information, for associating the authenticator with the identity information of the user. After registering the authenticator, the server may be capable of identifying the registered user via the authenticator, for example by receiving or by evaluating an authentication information, so that a repeated provision or transfer of the identity information for authenticating the registered user against the server may be unnecessary. For example, the server may be configured for association multiple authenticators with the registered user. For example, multiple natural persons may use the multiple authenticators associated with the registered user, increasing the flexibility and the user convenience of the system.

According to an embodiment, the server is configured for registering a user, for example by storing an identity information about the user. As the server is configured for registering a user, new users may conveniently join the system.

According to an embodiment, the server comprises an access information, the access information associating the registered user with the access right for the identified data set, and optionally with an access right for further data sets. For example, the access information may define one or more registered users to possess an individual access right for a specific data set. Having the access information allows the server to organize the access rights for one or more data sets very efficiently.

According to an embodiment, the server is configured for directing the client requesting access to the server to the identified data set, for example, the data set identified by the unique identifier used by the client for accessing the server. Directing the client to the identified data set is very convenient for the user requesting access to the identified data set.

According to an embodiment, the server is configured for using a cryptographic system for validating the authentication information, wherein the server is configured for associating the authenticator with a cryptographic key that is specific to the authenticator. For example, the cryptographic system may be based on an asymmetric cryptographic system, and the server may associate the authenticator with a public key information of the authenticator. Using cryptography allows for a secure, efficient and user convenient verification of the identity of the authenticator.

An embodiment according to the invention provides a device for obtaining a data set, for example designated as the identified data set, via a digital communication network. The device is configured for obtaining, for example receiving or recognizing, an unique identifier of the data set, the unique identifier representing a network address for accessing the data set via the digital communication network, wherein the unique identifier is specific to the data set. The device comprises a client configured for using the unique identifier for sending a request for accessing the data set to a server providing the data set. The client is configured for providing the server with an authentication information of an authenticator for authenticating the client against the server, wherein the authenticator is associated with a registered user. By using the unique identifier, that is specific to the data set, for sending the request for accessing the data set, retrieving false information, for example another data set, from the server may be avoided. For example, the device is may act as a counterpart for the server described before. For example, a user may use the device for retrieving or requesting the data set from the server. Accordingly, details, functionalities and advantages of the server and features thereof, equally apply to the device, wherever applicable.

According to an embodiment, the device comprises the authenticator. Thus, an availability of the authenticator to the device, and also to the client, is particularly high, improving the user convenience.

According to an embodiment, the device is configured for having access to the authenticator via a digital interface. For example, the authenticator is part of an external device connected to the device via the digital interface. Thus, the external device comprising the authenticator may be removed from the device, so that the device may be disabled to authenticate against the server. Thus, only a person in possession of the external device comprising the authenticator or having access to the authenticator may use the device for requesting the data set. Preventing unauthorized persons from using the device may increase the data security.

According to an embodiment, the device comprises an input interface for receiving an user input, wherein the device is configured for selectively providing the authentication information to the server in dependence on the user input. For example, the device may be configured for allowing for a usage of the authenticator for providing the authentication information in dependence on a verification of a presence of a user or an identity of a user. Thus, the input interface may ensure an authorization of a user to use the device, what increases the data security for requesting the data set.

According to an embodiment, the device is configured for obtaining a biometric information about a user, wherein the device is configured for selectively providing the authentication information to the server, if the biometric information identifies the user as being associated with the authenticator. For example, the biometric information may be obtained from the user input or an user interaction via the input interface. A biometric information is a particularly secure and a particularly convenient way of identifying a natural person.

According to an embodiment, the device is configured for retrieving the unique identifier from a graphical pattern representing the unique identifier, for example a barcode or a QR-code. Providing the unique identifier to the device as a graphical pattern is a convenient way for a user to enter the unique identifier to the device. Additionally, providing the unique identifier as graphical pattern may avoid a false entry of the unique identifier or a provision of a false unique identifier to the device, therefore ensuring that a correct data set is requested.

According to an embodiment, the authenticator comprises a cryptographic key, for example a secrete key or a private key, and the authenticator is configured for using the cryptographic key for providing the authentication information to the server. For example, the cryptographic key and a further cryptographic key of the authenticator, which is known to the server, for example a cryptographic key that the server associates with the authenticator, for example a public key, may be part of an asymmetric cryptographic system. For example, each of the cryptographic keys may be adapted to decrypt a message that has been encrypted with the respective other key. Using the cryptographic key for providing the authentication information allows for a secure validation of the authenticator against the server.

According to an embodiment, the authentication information allows for an anonymized authenticating of the registered user against the server, for example without transmitting any user name data or password data, for example relying on a verification that the authentication information, for example an encrypted message, has been generated by using an authenticator, for example an authenticator comprising a cryptographic key of a certain registered user. For example, the authenticator is anonymized. For example, the authenticator may be represented by an information that does not comprise a hint on personal data, e.g. a name or a contact information, of the registered user associated with the authenticator.

An embodiment according to the invention provides a method for providing one or more data sets via a digital communication network. The method comprises associating an unique identifier with an identified data set, the unique identifier representing a network address for accessing an identified data set via the digital communication network, wherein the unique identifier is specific to the identified data set. The method further comprises a step of validating an authentication information provided by an authenticator of a client requesting access to one or more data sets via the unique identifier. The method further comprises a step of selectively providing the client with an access right to one or more data sets, if the authentication information identifies the authenticator as being associated with a registered user.

An embodiment according to the invention provides a method for obtaining a data set via a digital communication network. The method comprises obtaining an unique identifier of the data set, the unique identifier representing a network address for accessing the data set via the digital communication network, wherein the unique identifier is specific to the data set. The method further comprises using the unique identifier for sending a request for accessing a server hosting the data set. The method further comprises providing the server with an authentication information of an authenticator for authenticating the client against the server, wherein the authenticator is associated with a registered user.

The described methods rely on the same ideas as the devices, i.e. the server and the device for obtaining a data set, described above, the methods providing equivalent functionalities and advantages. The methods may optionally be combined with or supplemented by any of the features, functionalities and details described herein with respect to the corresponding devices. The methods may optionally be combined with the mentioned features, functionalities and details both individually or in any combination of them.

BRIEF DESCRIPTION OF THE DRAWINGS

Embodiments of the present invention will be detailed subsequently referring to the appended drawings, in which.

DETAILED DESCRIPTION OF THE INVENTION

In the following, different inventive embodiments and aspects will be described. Also, further embodiments will be defined by the enclosed claims.

It should be noted that any embodiments as defined by the claims can be supplemented by any of the details (features and functionalities) described herein. Also, the embodiments described herein can be used individually, and can also optionally be supplemented by any of the details (features and functionalities) included in the claims. Also, it should be noted that individual aspects described herein can be used individually or in combination. Thus, details can be added to each of said individual aspects without adding details to another one of said aspects. It should also be noted that the present disclosure describes explicitly or implicitly features usable for transferring, providing, retrieving, requesting or receiving information.

The invention will be understood more fully from the detailed description given below and from the accompanying drawings of embodiments of the invention, which, however, should not be taken to limit the invention to the specific embodiments described, but are for explanation and understanding only.

In the figures, elements drawn in dashed lines are shown to support a better understanding, but these elements are not necessarily part of the shown embodiment.

1. Embodiments of a Server for Providing One or More Data Sets According to FIG. 1

Figure 1:
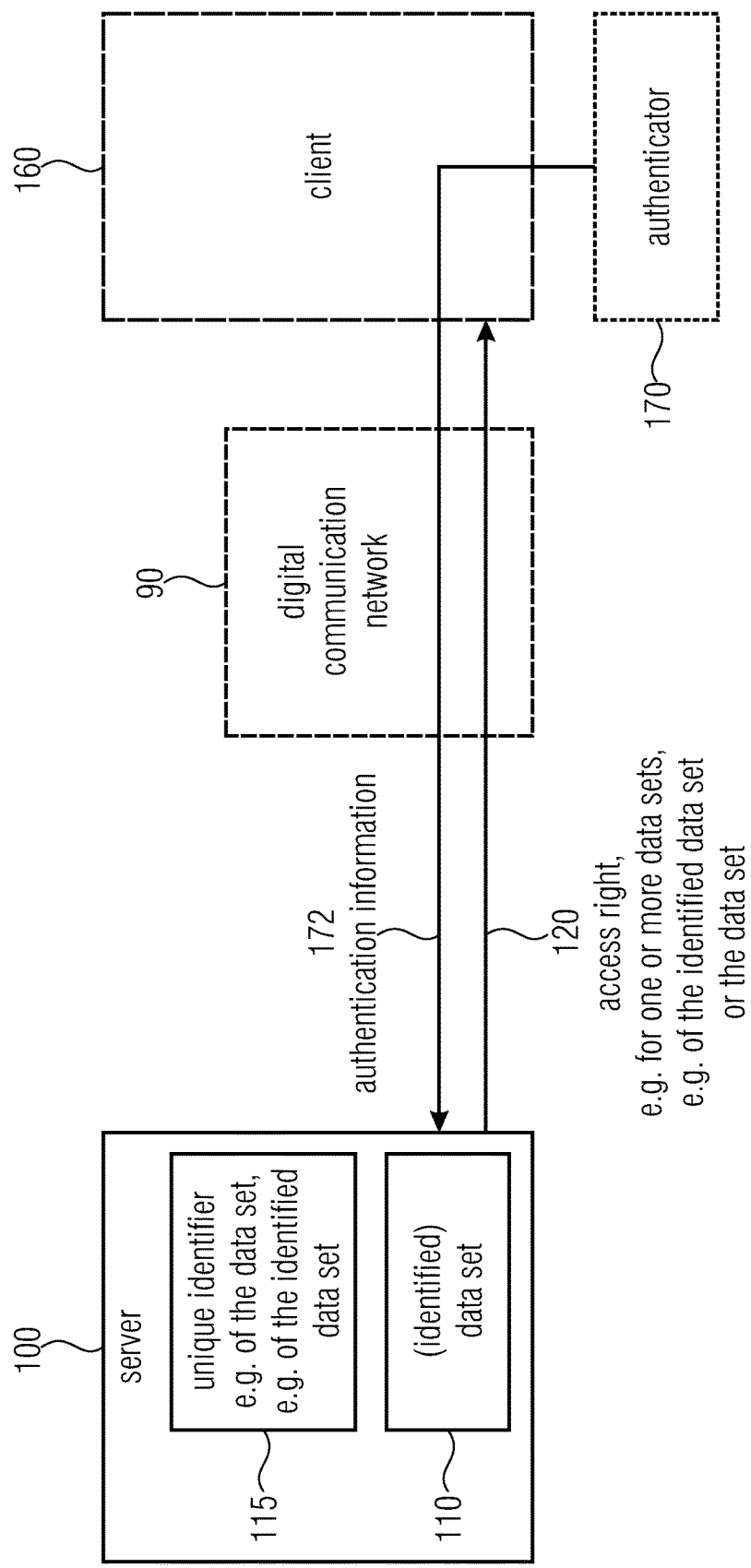
FIG. 1 shows a schematic representation of a server according to an embodiment.

FIG. 1 shows a schematic representation of a server 100 according to an embodiment. The server 100 is configured for providing one or more data sets via a digital communication network 90. Further, the server 100 is configured for associating an unique identifier 115 with an identified data set 110, which may be part of the one or more data sets. The unique identifier 115 represents a network address for accessing the identified data set 110 via the digital communication network 90, wherein the unique identifier 115 is specific to the identified data set 110. The server 100 is further configured for validating an authentication information 172 provided by an authenticator 170 of a client 160 requesting access to the server 100 via the unique identifier 115. The server is configured for selectively providing the client 160 with an access right 120 to one or more data sets, if the authentication information 172 identifies the authenticator as being associated with a registered user.

According to an embodiment, the server 100 is configured for validating the authentication information 172 provided by the authenticator 170 of the client 160 requesting access to the identified data set 110 via the unique identifier 115. Thus, the server may configured for handling an request for accessing a specific data set of the one or more data sets, for example the data set 110. Additionally, the server 100 may be configured for selectively providing the client 160 with an access right 120 for the identified data set 100, wherein the access right 120 for the identified data set is specific to the registered user associated with the authenticator. Thus, the server may provide the client 160 with different access rights depending on an identity of the authenticator 170, with which the client 160 authenticates against the server by sending the authentication information 172, wherein the identity of the authenticator 170 is associated with the registered user.

According to an alternative embodiment, the server 100 is configured for providing a data set 110, also designated or referred to as identified data set 110, via a digital communication network 90. Further, the server 100 is configured for associating an unique identifier 115 with the data set 110, the unique identifier 115 representing a network address for accessing the data set 110 via the digital communication network 90, wherein the unique identifier 115 is specific to the data set 110. The server 100 is further configured for validating an authentication information 172 provided by an authenticator 170 of a client 160 requesting access to the data set 110 via the unique identifier 115. According to this embodiment, The server 100 is further configured for selectively providing the client 160 with an access right 120 for the data set 110, the access right 120 being specific to a registered user that is associated with the authenticator 160.

Further details of the server 100 are described in the context of further embodiments according to the following figures. In particular, for the sake of clarity, further details of the server 100 are described in the context of an interplay between a server and a device for obtaining a data set. It should be noted that the embodiments of the server can optionally be supplemented by any of the features, functionalities and details described herein with respect to the other embodiments, both individually and taken in combination.

2. Device for Obtaining a Data Set According to FIG. 2

Figure 2:
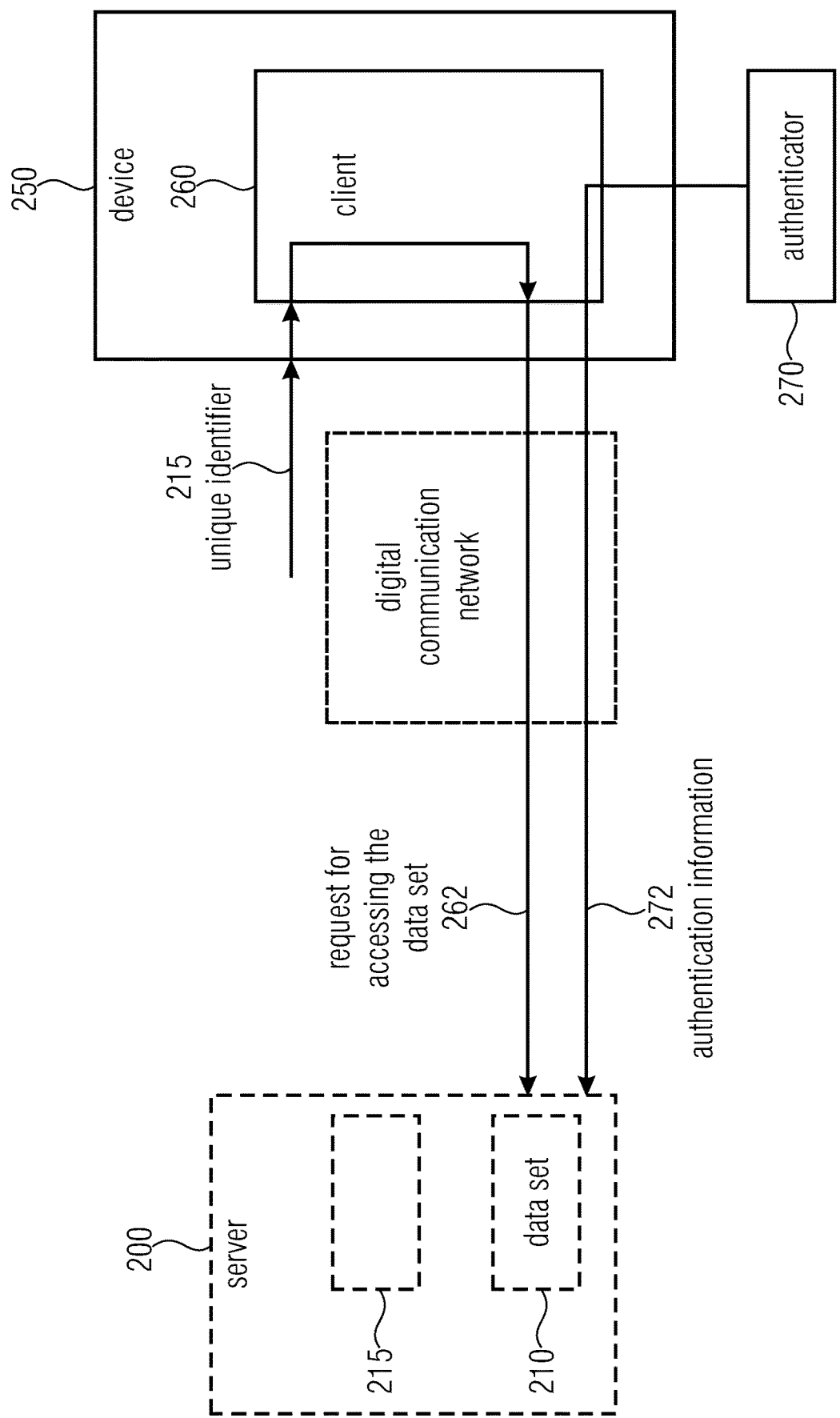
FIG. 2 shows a schematic representation of a device for obtaining a data set according to an embodiment.

FIG. 2 shows a schematic representation of an embodiment of a device 250 for obtaining a data set 210 via a digital communication network 90. The data set 210 may be similar to the data set 110 or the identified data set 110 and may be provided by a server 200, for example the server 100. The device 250 is configured for obtaining an unique identifier 215 of the data set 210, the unique identifier 215 representing a network address for accessing the data set 210 via the digital communication network 90, wherein the unique identifier 215 is specific to the data set 210. For example, the unique identifier 215 may be provided by the server 200. The device 250 comprises a client 260 which may be similar to the client 160.

For example, the client 360 may be an internet browser or a file browser or another unit configured for communicating with the digital communication network 90. The client 260 is configured for using the unique identifier 215 for sending a request 262 for accessing the data set 210 to a server 200 providing the data set 210. The client 260 is further configured for providing the server 200 with an authentication information 272 of an authenticator 270 for authenticating the client 260 against the server 200, wherein the authenticator 270 is associated with a registered user. For example, the authenticator 270 and the authentication information 272 may be similar to the authenticator 170 and the authentication information 172, respectively.

Further details of the device 250 are described in the context of further embodiments according to the following figures. In particular, for the sake of clarity, further details of the device 250 are described in the context of an interplay between a server and a device for obtaining a data set. It should be noted that the embodiments of the device 250 can optionally be supplemented by any of the features, functionalities and details described herein with respect to the other embodiments, both individually and taken in combination.

3. Interplay Between a Server and a Device for Obtaining a Data Set According to FIG. 3

Figure 3:
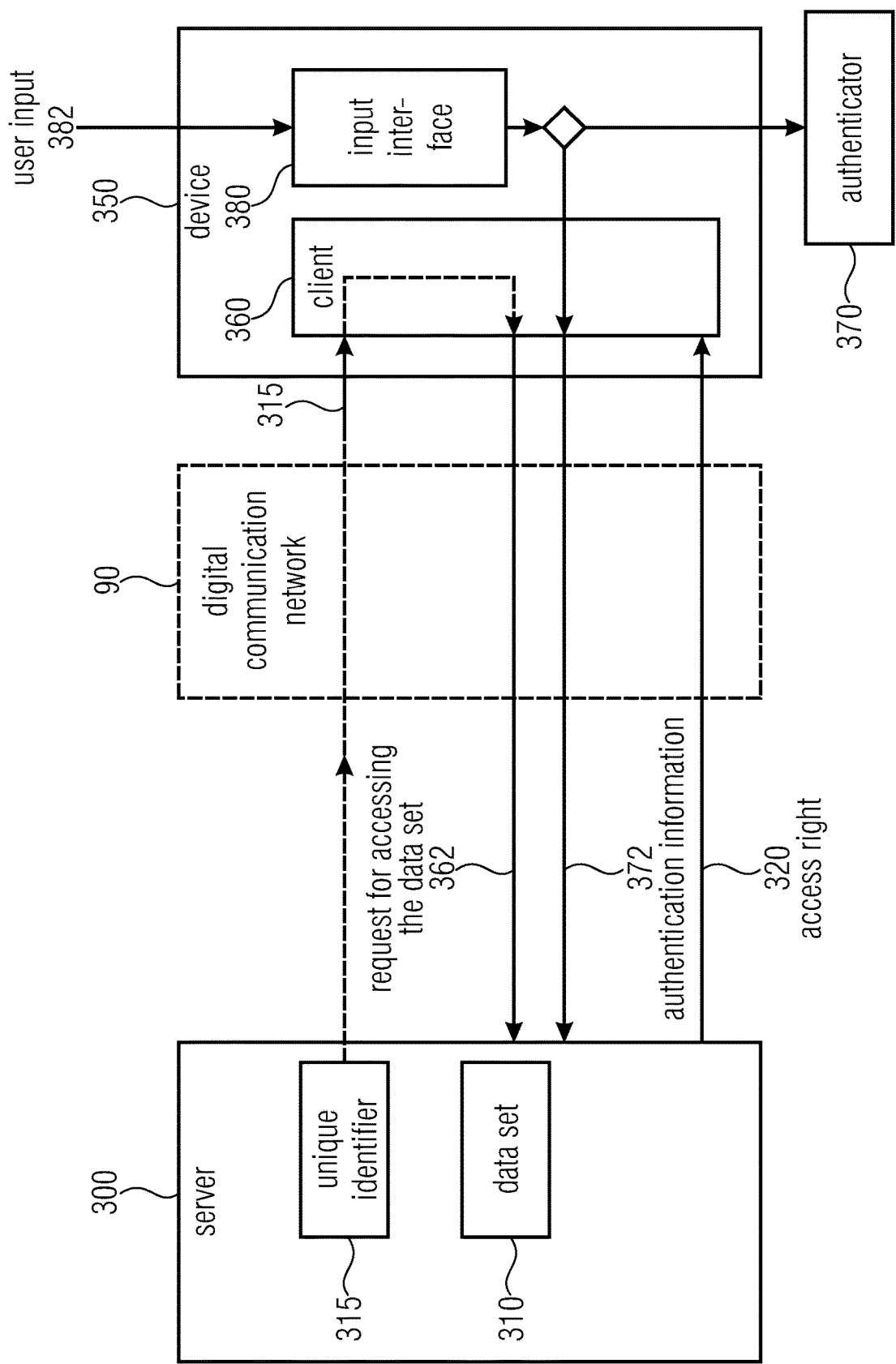
FIG. 3 shows a schematic representation of a server and a device for obtaining a data set according to an embodiment.

FIG. 3 schematically illustrates an interplay between a sever 300, which may be similar to the server 100;200, and a device 350 for obtaining a data set, which may be similar to the device 150;250. The server 300 and the device 350 may communicate via the digital communication network 90, for example the internet. The server 300 may provide one or more data sets including the data set 310, for example the server 300 may host the one or more data sets or the server 300 may be capable of providing access to one or more data sets hosted elsewhere. The server is configured for associating the data set 310 with an unique identifier 315, for example the unique identifier 115;215. The unique identifier 315 represents a network address which may allow for specifically addressing the data set 310 110 when accessing the server via the digital communication network 90. For example, a user intending to retrieve the data set 310 may use the device 350 for specifically requesting the data set 310 by calling the unique identifier 315 using the client 360 of the device 350, thus sending a request 362 to the server 300 for accessing the data set 310.

For example, the unique identifier 315 may comprise a network address of the server 300 and an unique data set identifier which uniquely identifies the data set 310 within an entity of information or data sets provided by the server 300. The unique data set identifier may also be globally unique within an specific entity of identifiers. The unique identifier 315 may further comprise an information about a syntax or a type or a scheme for the unique data set identifier. Additionally, the unique identifier 315 may comprise an information about a syntax of the unique identifier 315.

According to an embodiment, the unique identifier 315 is represented by a uniform resource identifier (URI). In other words, the requested data, e.g. the data set 310, is identified by using a specially constructed URI. The URI consist of four parts, the SCHEME, the BASEURL, the IDENTIFIERTYPE, and the IDENTIFIER itself. The SCHEME is defined by IETF in RFC 3986 [1]. The BASEURL is the domain name of the server which will receive the user request e.g. example.com [1]. The IDENTIFIERTYPE defines the type of the following identifier, ideally an international standard like GS1 GDTI (for documents), but could also be any internally defined identifier type or a similar technological approach. After the identifier type follows the IDENTIFIER itself, consisting of a unique string representing the link to the analyzed data. The IDENTIFIER has to be system inherent or in combination with IDENTIFIERTYPE global unique string. Combining all parts a possible valid URI could be:

https://example.com/gdti/408980809ADHJKCGGHBKN

For example, it may be important that the identifier is a unique string for every data object requested. A possible way to ensure the uniqueness of this identifier, for example the unique identifier 315, is to relay on international standards like the ones from GS1 which are also mentioned in the EU Medical Device Regulation (MDR) and the In-vitro Diagnostic Regulation (IVDR). By using a the above described URI format, a data object, for example the data set 310, may be uniquely identified and made accessible.

The client 360 may be similar to the client 160;260. For example, the client 360 may comprise or be part of an internet browser or a file browser or another unit for navigating in a digital communication network which may, for example be utilized by a user for accessing the server 100 or one of the data sets hosted by the server.

The server 300 may be configured for selectively granting access to the data set 310 and optional additional data sets in dependence on an identity of a user using the client 360 for accessing the server 300. For this purpose, the server 300 may verify, if the request 362 for accessing the data set originates from a registered user, and optionally, the server 300 may check the identity of the registered user requesting access to the server.

For authenticating as a registered user, a user may be represented by an authenticator 370. For example, a registered user may simply be represented by a previously registered authenticator 370. The authenticator 370 may comprise a cryptographic entity that allows for an unique identification of the authenticator 370 within a cryptographic system. For example, the authenticator may comprise a pair of cryptographic keys, for example a private key that is secret to the authenticator and a public key.

According to an embodiment, the server 300 is configured for registering the authenticator 370 by associating the authenticator 370 with an identity information identifying the registered user.

For example, a registered user may register the authenticator 370, so that after the registration, the authenticator 370 is associated with the registered user. For example, the server 300 may store the public key of the authenticator 370 for registering the authenticator 370.

For example, the server 300 is configured for using a cryptographic system for validating the authentication information 372, wherein the server 300 is configured for associating the authenticator 370 with a cryptographic key that is specific to the authenticator 370.

According to an embodiment, a registered user may register one or more authenticators. A possible scheme for registering an authenticator is described in the context of FIG. 4.

The client 360 may use the authenticator 370 associated with the registered user for verifying that a request for accessing the server occurs on behalf of a registered user and/or for verifying the identity of the registered user requesting access to the server. For example, the authentication of the identity of the authenticator 370 is based on an exchange of an encrypted message between the server 300 and the client 360.

According to an embodiment, the authenticator 370 may comprise a cryptographic key, and the authenticator 370 may be configured for using the cryptographic key for providing the authentication information 372 to the server.

For example, the server 300 may send an validation information to the device 350. The device 350 may encrypt or sign the validation information by using a secret key of the authenticator 370, for example the private key of the pair of keys, for obtaining the authentication information 372. The client 360 may send the authentication information 372 to the server 300. The server 300 may validate the identity of the authenticator 370 by testing if decrypting the authentication information 372 using the public key of the authenticator 370 results into the validation information as originally sent to the client 370 or by using the public key for testing, if the signature of the authentication information was generated by using the private key. As the server may associate the authenticator 370 with the registered user, this authentication procedure allows for an authentication of the registered user against the server without transmitting information about the user identity. Thus, the authentication information 372 may allow for an anonymized authenticating of the registered user against the server.

Alternatively, the cryptographic system may be symmetric. That is, the server 300 comprises a cryptographic key associated to the authenticator 370, wherein the common cryptographic key is secret to the authenticator 370 and the server 300, wherein the server 300 uses the common cryptographic key for decrypting the authentication information 372, and wherein the authentication information 372 is obtained by the device 350 by decrypting the validation information by using the common cryptographic key.

In other words, in order to access the requested information, e.g. the data set, the requester may have to authenticate against the system or the server holding this information. For example, the authentication itself may be based on the WebAuthn standard and may require a so called authentication device. Every user of the system may be able to register one or more of these devices, as an alternate method for the classical username-password authentication. By using this kind of authentication, there may be no need to exchange personal data between the client and the server. For example, the only data exchanged is a public key, based on the users authentication device.

The arrangement of the authenticator 370 in FIGS. 1-3 is schematic and exemplary. The device 350 or the client 360 may comprise the authenticator 370. Thus, the device may, for example, have access to the authenticator at any time of operation.

According to an embodiment, the device 350 is configured for having access to the authenticator 370 via a digital interface. For example, the authenticator 370 may be part of an external device connected to the device 350 via the digital interface. Thus, the device 350 may only authenticate using the authenticator 370, if the external device is connected to the device 350.

According to an embodiment, the server comprises an access information, the access information associating the registered user with the access right for the data set 310, and optionally with an access right for further data sets.

For example, the access right for the data set 310 may comprise specific permissions for the data set 310, for example, a right to receive the data set 310 in a specific form, or to download, delete or modify the data set 310. For example, the access right may be defined for a specific user or for specific groups of users or roles. For example, the access information associates the registered user with one or more roles or groups of users.

According to an embodiment, the server 300 is configured to provide a client that authenticates with an authenticator associated to any registered user with access to the data set 310 and optionally to further data sets, for example all data sets provided by the server 300.

According to an embodiment, the server 300 is configured for directing the client 360 requesting access to the server 300 to the identified data set.

For example, the client 360 may access the server 300 by using the unique identifier 315. After authentication, the server 300 may direct the client 360 to the data set 310 identified by the unique identifier 315. Optionally, the server 300 may provide the client 360 with access to further data sets without again demanding for authentication.

According to an embodiment, the device 350 comprises an input interface 380 for receiving an user input 382, wherein the device 350 is configured for selectively providing the authentication information 372 to the server in dependence on the user input 372.

For example, the device 350 may require a user to actively initiate the request for accessing the data set 310, or to confirm an initiation of the request for accessing the data set 310 by the user input 382. For example, the device may allow the client 360 to use the authenticator 370 only after a user initiated or confirmed the usage via the user input 382. For example, the user input 382 may comprise an input via a keyboard, a touch screen, a scanner unit, or a camera.

According to an embodiment, the device 350 is configured for obtaining a biometric information about a user, wherein the device 350 is configured for selectively providing the authentication information 372 to the server 300, if the biometric information identifies the user as being associated with the authenticator 372.

For example, the user input comprises a user's fingerprint or an image of a user's face. The device 350 may associate the authenticator 370 with the identity of one or more users al-lowed to use the authenticator 370. For example, the device may allow the client 360 to use the authenticator 370 only after an associated user initiated or confirmed the usage via the user input 382.

According to an embodiment, the device 300 is configured for retrieving the unique identifier 315 from a graphical pattern representing the unique identifier 315. For example, the device may receive the unique identifier 315 from a scanner unit or a camera capable, which may optionally be part of the device 350 or may be an external device.

For example the user input 382 may comprise scanning the graphical pattern. For example, a user scanning the graphical pattern may initiate the request for accessing the data set identified by the unique identifier represented by the graphical pattern.

4. Registration of an Authenticator According to FIG. 4

Figure 4:
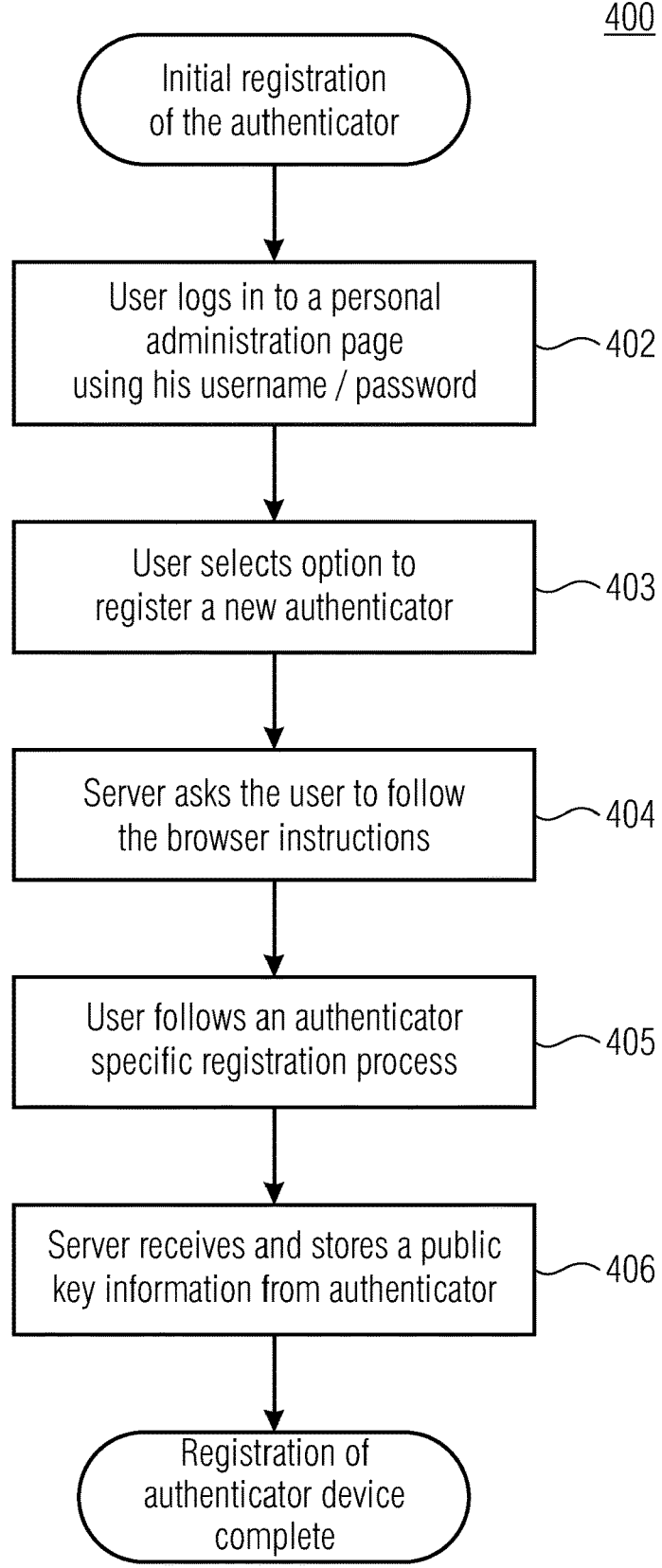
FIG. 4 shows a flow chart for a method for registering a user according to an embodiment.

FIG. 4 shows a flow chart of a method 400 for registering an authenticator, for example the authenticator 170;270;370 according to an embodiment. The authenticator to be registered may be part of a device for obtaining a data set, e.g., the device 150;250;350, or may be connected to such a device. For registration, the authenticator may also be connected to another device.

The method 400 may be applied for an initial registration of the authenticator. A step 402 comprises a login of a user, e.g. a registered user, to a personal administration page using a user name and a password. For example, the administration page may be hosted by the server 100;200;300. The administration page may also be hosted on another server that is configured for sharing information about a registered authenticator with the server 100;200;300. In another step 403, the user may select the option to register a new authenticator. Subsequently, in step 404, the server asks the user to follow the browser, or an specific App (i.e. a piece of software from something alike the Apple App-Store) instructions. Subsequently, in step 405, the user follows an authenticator specific registration process. In step 406, the server receives and stores a public key information from the authenticator to complete the registration of the authenticator.

For example, the registration of an authentication device, may follow the principles defined by the WebAuthn standard [2]. After a successful initial login, the user is able to register a new security key/device. A security device can be, according to the WebAuthn specification, either a platform authenticator or a roaming authenticator. The main difference is that a platform authenticator is physically bound to the client device (e.g. smartphone or laptop), while a roaming authenticator (e.g. an USB security key) is removable and can be attached to different client devices. During the registration process the server side component associates the public key, which is provided by the authenticator, with the user information.

5. Method for Providing One or More Data Sets According to FIG. 5

Figure 5:
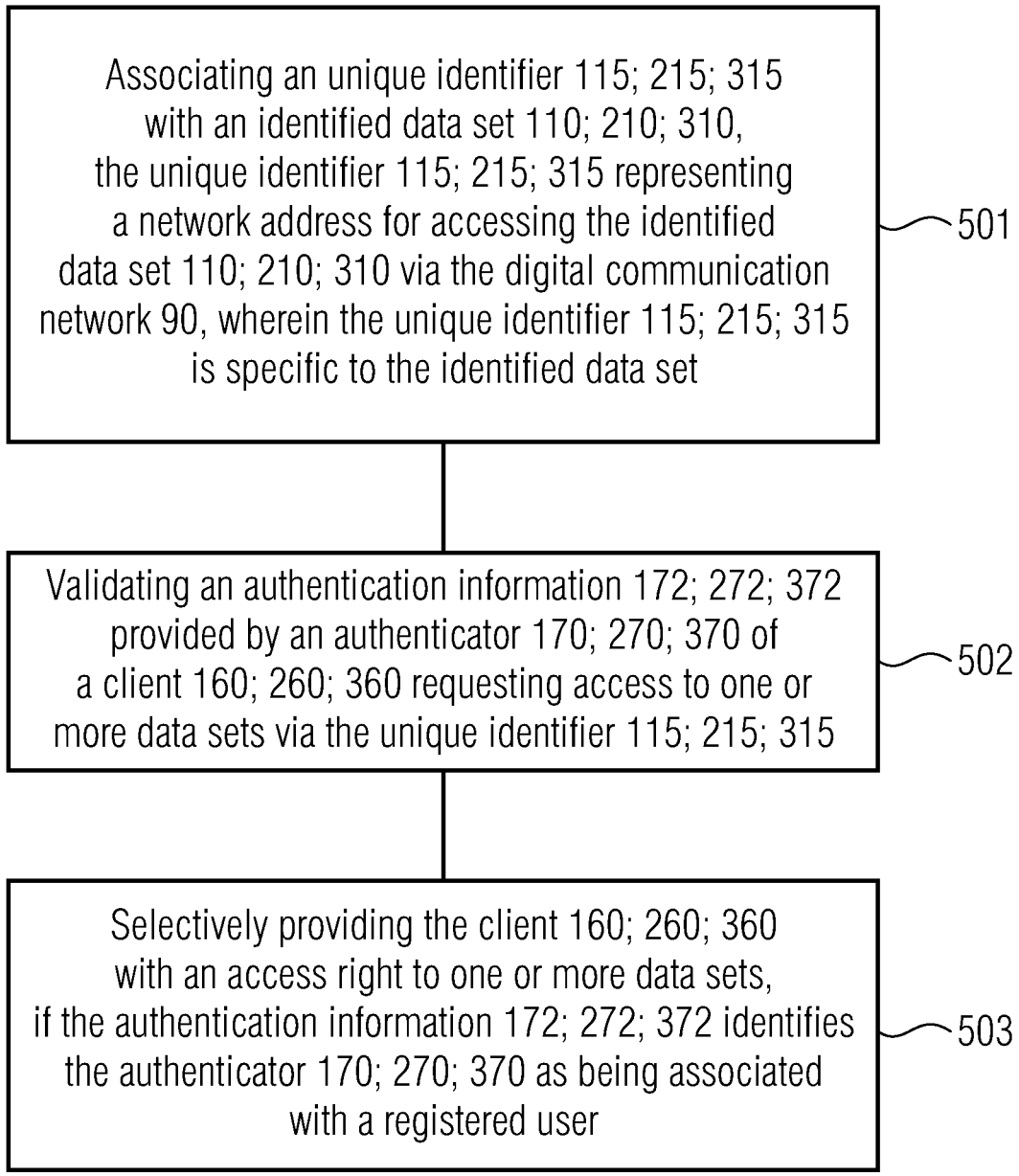
FIG. 5 shows a flow chart of a method for providing one or more data sets according to an embodiment.

FIG. 5 shows a flow chart of an embodiment of a method 500 for providing one or more data sets, for example the data set 110;210;310 via a digital communication network.

The method 500 comprises a step 501 of associating an unique identifier 115;215;315 with an identified data set 110;210;310, the unique identifier 115;215;315 representing a network address for accessing the identified data set 110;210;310 via the digital communication network 90, wherein the unique identifier 115;215;315 is specific to the identified data set. A further step 502 comprises validating 502 an authentication information 172;272;372 provided by an authenticator 170;270;370 of a client 160;260;360 requesting access to one or more data sets via the unique identifier 115;215;315. The method 500 comprises a further step 503 of selectively providing the client 160;260;360 with an access right to one or more data sets, if the authentication information 172;272;372 identifies the authenticator 170; 270;370 as being associated with a registered user.

The order of the steps of the method 500 as shown in FIG. 5 is chosen exemplarily. For example, the steps 502 and 503 may be executed independently from step 501.

6. Method for Obtaining a Data Sets According to FIG. 6

Figure 6:
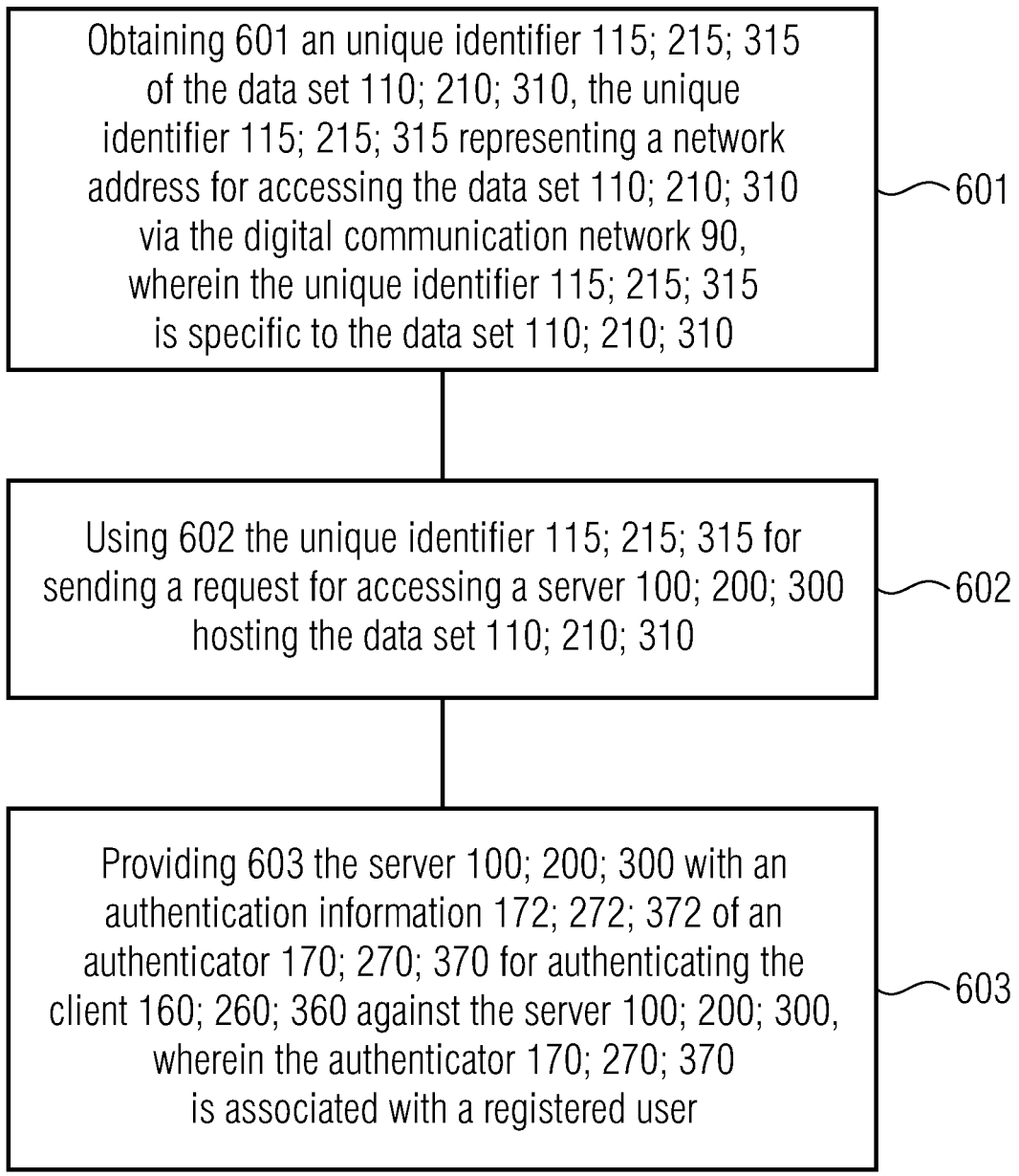
FIG. 6 shows a flow of a method for obtaining a data set according to an embodiment.

FIG. 6 shows a flow chart of an embodiment of a method 600 for obtaining a data set 110;210;310 via a digital communication network 90.

The method 600 comprises a step 601 of obtaining an unique identifier 115;215;315 of the data set 110;210;310, the unique identifier 115;215;315 representing a network address for accessing the data set 110;210;310 via the digital communication network 90, wherein the unique identifier 115;215;315 is specific to the data set 110;210;310. The method comprises a further step 602 of using the unique identifier 115;215;315 for sending a request for accessing a server 100;200;300 hosting the data set 110;210;310. The further step 603 comprises providing the server 100;200;300 with an authentication information 172;272;372 of an authenticator 170;270;370 for authenticating the client 160; 260;360 against the server 100;200;300, wherein the authenticator 170;270;370 is associated with a registered user.

The order of the steps of the method 600 as shown in FIG. 6 is chosen exemplarily. For example, after obtaining 601 the unique identifier the steps 602 and 603 may be executed repeatedly and/or independently from step 601.

7. Method for Transferring a Data Set According to FIG. 7

Figure 7:
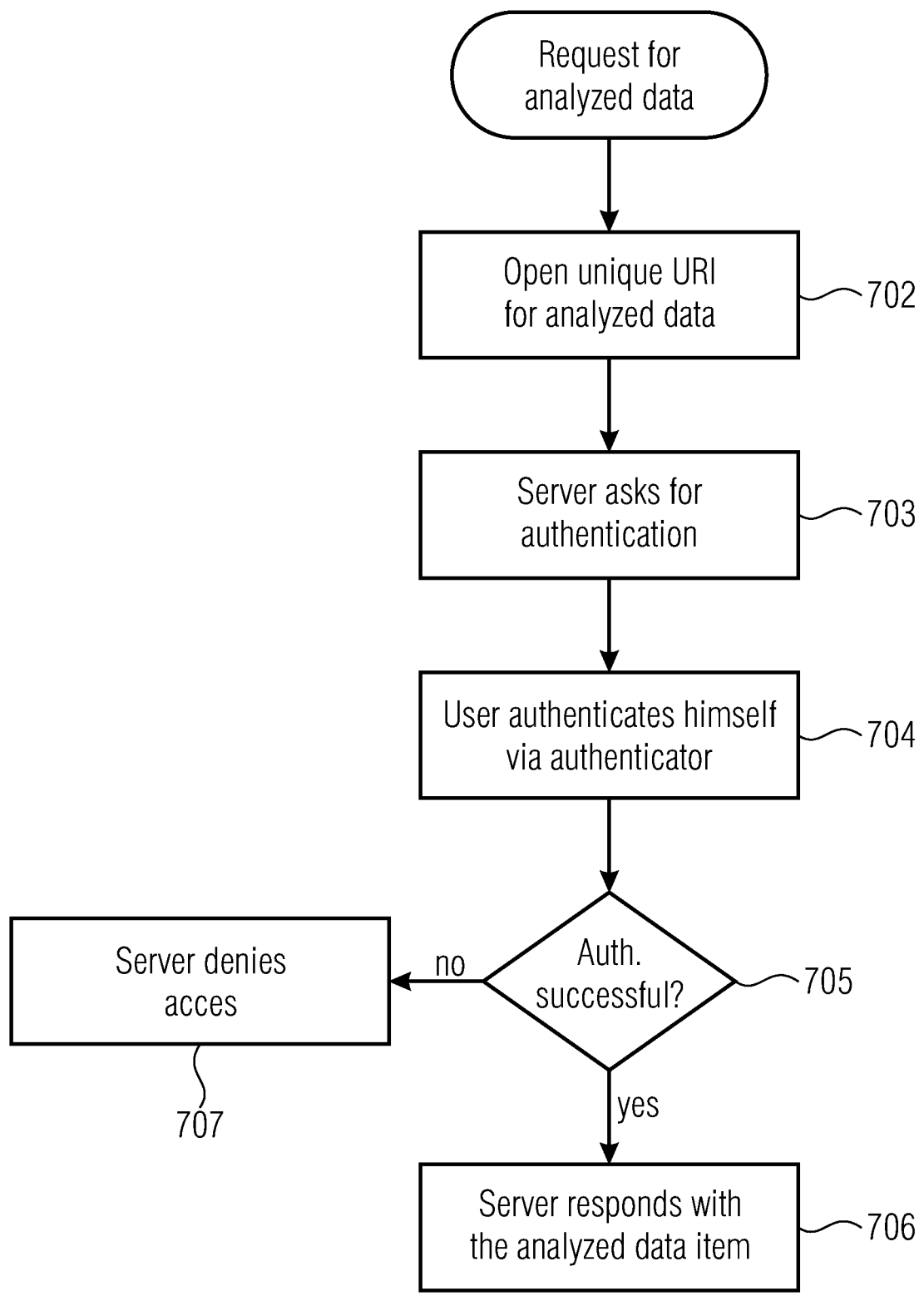
FIG. 7 shows a flow chart of a method for transferring a data set between a server and a device for obtaining a data set according to a further embodiment.

FIG. 7 shows a flow chart of an embodiment of a method 700 for transferring a data set between a server and a device for obtaining a data set. For example, the method 700 may combine features of the methods 500 and 600, which may be executed by the server 100;200;300 or the device 150;250; 350.

The method 700 comprises an opening 702 of an unique URI for an analyzed data item, e.g. the data set 110;210;310. For example, the step 702 may comprise the step 602. For example, the URI directs to a server, e.g. the server 100; 200;300. Subsequently, in step 703, the server asks for authentication. In the following step 704, the user authenticates himself via the authenticator, e.g. the authenticator 170;270;370. For example, the step 704 may comprise the step 603. In step 705, the server decides, if the authentication is successful, for example, if the user authenticates as a registered user or as a registered user authorized to access the requested data set. For example, the step 705 may comprise the step 502. If the authentication is successful, step 706 is executed, otherwise, step 707 is executed. In step 706, the server responds with the analyzed data item. For example, the step 706 may comprise the step 503. In step 707, the server denies the access, e.g. to the server or to the data item or data set.

In other words, after the successful registration of an authenticator, e.g the authenticator 170;270;370 the user is able to access the analyzed data, e.g. the data set 110;210; 310 via the provided URI, e.g. the unique identifier 115; 215;315, without providing a username or password. When opening the URI, for example by typing in the URI or by scanning a two-dimensional code, the user may have to authenticate himself by using the registered authenticator. The authentication process itself may also follow the principles of a WebAuthn compatible public key authentication mechanism, where the server validates the authentication information by letting the users authenticator cryptographically sign a given message with his private key and send it to the server. After that the server ensures that the transmitted message can be verified with the public key, stored on the server and associated with the user [3].

According to an embodiment, using this authentication method, there may be no need to transport any personal data to identify the user in order to access the information.

8. Additional Aspects and Embodiments

Embodiments of the disclosure relate to a method and system for securely retrieving information about analyzed (healthcare) data via the internet. For example, the information is requested by a client calling a well-formed URI [4] based on international standards which guarantees a unique one to one relation between the analyzed data and the gathered information about the data. The URI itself may be encoded and presented as a two dimensional code like a QR-code, a GS1 datamatrix or a similar technological approach, which is accessible through handheld as well as stationary devices.

According to an embodiment, in order to retrieve the information the client has to authenticate himself against the server using Public Key Cryptography mechanisms based on the Web Authentication API specification [2] or a similar technological approach. For example, after receiving the authentication information by the client, the server presents the information in HTML or a structured data format like for example json.

Embodiments of the disclosure relate to a method and system for securely retrieving analyzed (healthcare) data through a convenient and yet safe way.

Embodiments of the disclosure relate to a system for securely granting access to analyzed data via the internet, while keeping the identification of the data item unique and the identity of the requesting party secure.

Embodiments of the presented invention relate to a method, device or system which is able to create pseudonomized access to a remote service system, authenticate the specific user against the remote system using pseudonomyzed data and grant certain access right, i.e. permissions to this user based on roles. The requested data may thereby be uniquely identified in order to prevent false information.

While there has been a lot of progress in securing the transport of information via secure channels, using encrypted transport protocols, the invention of new authentication mechanisms, which are not relying on personal information like a username or an email address, has not been in the focus.

For example, combining a unique URI for object identification, using the WebauthN standard to authenticate a user without relying on personal data and finally presenting the requested information in a structured way, solves the described problems of current solutions in a modular and unique way.

For example, the specific identification of requested detailed information, for example an requested object or a data set, is inevitable, especially in the context of clinical data, containing information about a specific individual.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and com-positions of the present invention. It is therefore intended that the following appended claims be interpreted as including all such alterations, permutations and equivalents as fall within the true spirit and scope of the present invention.

REFERENCES

[1] https://tools.ietf.org/html/rfc3986
[2] https://w3c.github.io/webauthn/
[3] https://w3c.github.io/webauthn/#sctn-sample-authentication
[4] https://tools.ietf.org/html/rfc1630

The invention claimed is:

1. A server for providing one or more data sets via a digital communication network, wherein the server is configured for:
  associating a unique identifier with an identified data set, the unique identifier representing a network address for accessing the identified data set via the digital communication network, wherein the unique identifier is specific to the identified data set,
  validating an authentication information provided by a client requesting access to the server via the unique identifier, the authentication information being obtained by the client by using an authenticator, and
  selectively providing the client with an access right for one or more data sets, if the authentication information identifies the authenticator as being associated with a registered user, the one or more data sets including the identified data set,
  wherein the authentication information does not comprise a username, a password and personal data of the registered user so that the authentication information allows for an anonymized authenticating of the registered user against the server,
  wherein the authenticator is represented by an information that does not comprise personal data or a hint on personal data of the registered user associated with the authenticator,
  wherein the authentication information comprises an encrypted message which has been generated by using the authenticator, and wherein the server is configured for using a cryptographic key for validating the authentication information, wherein the cryptographic key is associated with the registered user.

2. The server according to claim 1,
wherein the server is configured for validating the authentication information provided by the authenticator of the client requesting access to the identified data set via the unique identifier;
wherein the server is configured for selectively providing the client with an access right for the identified data set, and
wherein the access right for the identified data set is specific to the registered user associated with the authenticator.

3. A server for providing a data set via a digital communication network, wherein the server is configured for-:
associating a unique identifier with the data set, the unique identifier representing a network address for accessing the data set via the digital communication network, wherein the unique identifier is specific to the data set,
validating an authentication information provided by a client requesting access to the data set via the unique identifier, the authentication information being obtained by the client by using an authenticator, and
selectively providing the client with an access right for the data set, the access right being specific to a registered user that is associated with the authenticator,
wherein the authentication information does not comprise a username, a password and personal data of the registered user so that the authentication information allows for an anonymized authenticating of the registered user against the server,
wherein the authentication information comprises an encrypted message which has been generated by using the authenticator,
wherein the authenticator is represented by an information that does not comprise personal data or a hint on personal data of the registered user associated with the authenticator,
wherein the server is configured for using a cryptographic key for validating the authentication information, wherein the cryptographic key is associated with the registered user.

4. The server according to claim 1,
wherein the server is configured for registering the authenticator by associating the authenticator with an identity information identifying the registered user.

5. The server according to claim 1,
wherein the server comprises an access information, the access information associating the registered user with the access right for the identified data set.

6. The server according to claim 1,
wherein the server is configured for directing the client requesting access to the server to the identified data set.

7. A device for acquiring a data set via a digital communication network,
wherein the device is configured for acquiring a unique identifier of the data set, the unique identifier representing a network address for accessing the data set via the digital communication network, wherein the unique identifier is specific to the data set,
wherein the device comprises a client configured for using the unique identifier for sending a request for accessing the data set to a server providing the data set,
wherein the client is configured for providing the server with an authentication information of an authenticator for authenticating the client against the server, wherein the authenticator is associated with a registered user,
wherein the authentication information does not comprise a username, a password and personal data of the registered user so that the authentication information allows for an anonymized authenticating of the registered user against the server,
wherein the authentication information comprises an encrypted message which has been generated by using the authenticator,
wherein the authenticator is represented by an information that does not comprise personal data or a hint on personal data of the registered user associated with the authenticator,
wherein the authenticator comprises a cryptographic key, and
wherein the authenticator is configured for using the cryptographic key for providing the authentication information to the server.

8. The device according to claim 7, wherein the device comprises the authenticator.

9. The device according to claim 7, wherein the device is configured for having access to the authenticator via a digital interface.

10. The device according to claim 7,
wherein the device comprises an input interface for receiving an user input, and
wherein the device is configured for selectively providing the authentication information to the server in dependence on the user input.

11. The device according to claim 7,
wherein the device is configured for acquiring a biometric information about a user, and
wherein the device is configured for selectively providing the authentication information to the server, if the biometric information identifies the user as being associated with the authenticator.

12. The device according to claim 7, wherein the device is configured for retrieving the unique identifier from a graphical pattern representing the unique identifier.

13. The device according to claim 7,
wherein the authentication information allows for an anonymized authenticating of the registered user against the server.

14. A method for providing one or more data sets via a digital communication network, the method comprising:
associating a unique identifier with an identified data set, the unique identifier representing a network address for accessing the identified data set via the digital communication network, wherein the unique identifier is specific to the identified data set,
validating an authentication information provided by a client requesting access to one or more data sets via the unique identifier, the authentication information being obtained by the client by using an authenticator, and
selectively providing the client with an access right to one or more data sets, if the authentication information identifies the authenticator as being associated with a registered user, the one or more data sets including the identified data set,
wherein the authentication information does not comprise a username, a password and personal data of the registered user so that the authentication information allows for an anonymized authenticating of the registered user against the server, wherein the authentication information comprises an encrypted message which has been generated by using the authenticator, wherein the authenticator is represented by an information that does not comprise personal data or a hint on personal data of the registered user associated with the authenticator, wherein the method comprises using a cryptographic key for validating the authentication information, wherein the cryptographic key is associated with the registered user.

15. A method for acquiring a data set via a digital communication network, the method comprising:

acquiring a unique identifier of the data set, the unique identifier representing a network address for accessing the data set via the digital communication network, wherein the unique identifier is specific to the data set, using the unique identifier for sending a request for accessing a server hosting the data set, providing the server with an authentication information of an authenticator for authenticating the client against the server, wherein the authenticator is associated with a registered user, wherein the authentication information does not comprise a username, a password and personal data of the registered user so that the authentication information allows for an anonymized authenticating of the registered user against the server, wherein the authentication information comprises an encrypted message which has been generated by using the authenticator, wherein the authenticator is represented by an information that does not comprise personal data or a hint on personal data of the registered user associated with the authenticator, wherein the authenticator comprises a cryptographic key, and wherein the method comprises using the cryptographic key for providing the authentication information to the server.

16. A non-transitory digital storage medium having a computer program stored thereon to perform the method for providing one or more data sets via a digital communication network, the method comprising:

associating a unique identifier with an identified data set, the unique identifier representing a network address for accessing the identified data set via the digital communication network, wherein the unique identifier is specific to the identified data set, validating an authentication information provided by a client requesting access to one or more data sets via the unique identifier, the authentication information being obtained by the client by using an authenticator, and selectively providing the client with an access right to one or more data sets, if the authentication information identifies the authenticator as being associated with a registered user, the one or more data sets including the identified data set, wherein the authentication information does not comprise a username, a password and personal data of the registered user so that the authentication information allows for an anonymized authenticating of the registered user against the server, wherein the authentication information comprises an encrypted message which has been generated by using the authenticator, wherein the authenticator is represented by an information that does not comprise personal data or a hint on personal data of the registered user associated with the authenticator, and wherein the method comprises using a cryptographic key for validating the authentication information, wherein the cryptographic key is associated with the registered user, when said computer program is run by a computer.

17. A non-transitory digital storage medium having a computer program stored thereon to perform the method for acquiring a data set via a digital communication network, the method comprising:

acquiring a unique identifier of the data set, the unique identifier representing a network address for accessing the data set via the digital communication network, wherein the unique identifier is specific to the data set, using the unique identifier for sending a request for accessing a server hosting the data set, providing the server with an authentication information of an authenticator for authenticating the client against the server, wherein the authenticator is associated with a registered user, wherein the authentication information does not comprise a username, a password and personal data of the registered user so that the authentication information allows for an anonymized authenticating of the registered user against the server, wherein the authentication information comprises an encrypted message which has been generated by using the authenticator, wherein the authenticator is represented by an information that does not comprise personal data or a hint on personal data of the registered user associated with the authenticator, wherein the authenticator comprises a cryptographic key, and wherein the method comprises using the cryptographic key for providing the authentication information to the server, when said computer program is run by a computer.

* * * * *